US011218563B1

(12) United States Patent
Parvataneni et al.

(10) Patent No.: US 11,218,563 B1
(45) Date of Patent: Jan. 4, 2022

(54) METHODS AND SYSTEMS FOR MULTI-ACCESS SERVER ORCHESTRATION

(71) Applicant: Verizon Patent and Licensing Inc., Basking Ridge, NJ (US)

(72) Inventors: Raghuram Parvataneni, Edison, NJ (US); Kirk Campbell, Long Valley, NJ (US); John Patrick Hickey, III, Metuchen, NJ (US); Anil K Guntupalli, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/996,685

(22) Filed: Aug. 18, 2020

(51) Int. Cl.
| | |
|---|---|
| *G06F 15/16* | (2006.01) |
| *H04L 29/08* | (2006.01) |
| *H04L 29/06* | (2006.01) |
| *H04W 8/26* | (2009.01) |
| *H04W 64/00* | (2009.01) |

(52) U.S. Cl.
CPC .......... *H04L 67/288* (2013.01); *H04L 67/289* (2013.01); *H04L 67/42* (2013.01); *H04W 8/26* (2013.01); *H04W 64/00* (2013.01)

(58) Field of Classification Search
None
See application file for complete search history.

(56) References Cited

U.S. PATENT DOCUMENTS

| | | | | |
|---|---|---|---|---|
| 7,886,023 | B1* | 2/2011 | Johnson | H04L 67/1019 709/219 |
| 2002/0065899 | A1* | 5/2002 | Smith | H04L 67/1095 709/214 |
| 2009/0113057 | A1* | 4/2009 | Van der Merwe | H04L 29/12349 709/227 |
| 2010/0208648 | A1* | 8/2010 | Narkar | H04L 67/1002 370/328 |
| 2019/0020657 | A1* | 1/2019 | Egner | G06Q 20/3224 |

* cited by examiner

*Primary Examiner* — Brian Whipple
*Assistant Examiner* — Gregory P Tolchinsky

(57) ABSTRACT

An illustrative multi-access server orchestration system obtains, by way of a communication network, a service request for a client device. The service request indicates a client identity of the client device and represents a request for orchestration of service to be provided to the client device by a multi-access server of a set of multi-access servers associated with the communication network. In response to the service request and based on the client identity, the orchestration system identifies a network anchor point through which network traffic on the communication network is routed to the client device. The orchestration system also determines a subset of the set of multi-access servers. The subset may correspond to a service area of the identified network anchor point and may include one or more multi-access servers capable of fulfilling the service request for the client device. Corresponding methods and systems are also disclosed.

20 Claims, 10 Drawing Sheets

Fig. 6A

Service Area of Network Anchor Point
(Unordered Listing of Multi-Access Servers) — 602

| Multi-Access Server ID | Geographic Location | Server Resources | Server Performance |
|---|---|---|---|
| Serv1209 | Loc1209 | Res1209 | Perf1209 |
| Serv0521 | Loc0521 | Res0521 | Perf0521 |
| Serv0918 | Loc0918 | Res0918 | Perf0918 |
| Serv0129 | Loc0129 | Res0129 | Perf0129 |
| Serv0923 | Loc0923 | Res0923 | Perf0923 |
| Serv1023 | Loc1023 | Res1023 | Perf1023 |

Fig. 6B

Service Area of Network Anchor Point
(Ordered Listing of Multi-Access Servers) — 604

| Order of Preference | Multi-Access Server ID | Geographic Location | Server Resources | Server Performance |
|---|---|---|---|---|
| 1 | Serv0923 | Loc0923 | Res0923 | Perf0923 |
| 2 | Serv1209 | Loc1209 | Res1209 | Perf1209 |
| 3 | Serv1023 | Loc1023 | Res1023 | Perf1023 |
| 4 | Serv0918 | Loc0918 | Res0918 | Perf0918 |
| 5 | Serv0129 | Loc0129 | Res0129 | Perf0129 |
| 6 | Serv0521 | Loc0521 | Res0521 | Perf0521 |

…

METHODS AND SYSTEMS FOR MULTI-ACCESS SERVER ORCHESTRATION

BACKGROUND INFORMATION

Modern computing commonly employs distributed computing architectures in which processing required by individual computing devices (e.g., mobile devices such as smartphones and tablets, Internet of Things (IoT) devices, consumer and business personal computers, etc.) is not performed exclusively by local computing resources of the devices themselves, but, rather, is at least partially performed by computing resources located elsewhere. Such distributed computing architectures may increase the efficiency of processing that is performed because, among other reasons, powerful computing resources shared by many devices can be concentrated and managed at a single site rather than being replicated in each device. One challenge that accompanies the use of distributed computing architectures is orchestrating which client devices are to be served by which distributed computing resources.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 6A-6B show illustrative subsets of multi-access servers determined by a multi-access server orchestration system to correspond to an illustrative service area of a network anchor point according to embodiments described herein.

DETAILED DESCRIPTION OF PREFERRED EMBODIMENTS

Figure 1:
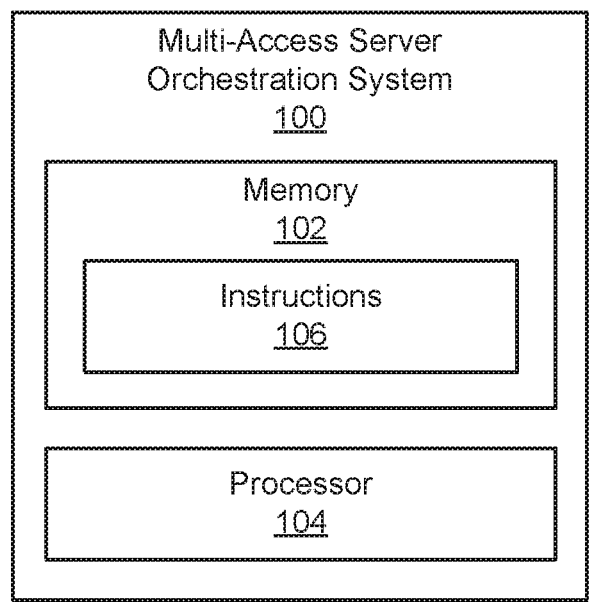
FIG. 1 shows an illustrative multi-access server orchestration system according to embodiments described herein.

Methods and systems for multi-access server orchestration are described herein. When various instances of multi-access servers (e.g., cloud servers, multi-access edge computing (MEC) servers, etc.) are available and capable of fulfilling a particular client device's service request, it may be a challenge to optimize the selection of which multi-access server is to be assigned to fulfill which service request, all while accounting for various factors such as transport and processing latencies, performance parameters associated with the service request, server resources and real-time performance capabilities, and so forth. Efficient implementations of distributed computing may involve various approaches to such server orchestration challenges. For example, when a set of multi-access servers (e.g., cloud servers, multi-access edge computing (MEC) servers, etc.) is accessible to a client device that is connected to a communication network and that is requesting fulfillment of a service request, server orchestration may refer to automatic and real-time algorithms, decision-making processes, operations, communications, etc., that relate to which multi-access server is to be assigned to fulfill the service request (i.e., which multi-access server is to provide the requested service to the client device).

When server orchestration accounts for various factors and real-time conditions of the communications network, the multi-access servers, and the client device, several distinct benefits may arise for users of client devices connected to the communication network, as well as for carrier entities responsible for providing and managing the communication network. For example, intelligent and efficient server orchestration may help ensure that users enjoy a high-quality experience as their devices are provided with responsive, powerful, efficient, and cost-effective service from distributed computing resources of the communication network. Meanwhile, the same intelligent and efficient server orchestration may facilitate carriers in increasing the density of service deployment to provide high-quality services to a larger number of customers in efficient and scalable ways.

To provide these and other valuable benefits, multi-access server orchestration methods and systems described herein may identify, determine, and account for service areas associated with network anchor points. As used herein, and as will be described in more detail below, a network anchor point (e.g., an Internet Protocol (IP) anchor point, etc.) may refer to a gateway, proxy server, or other network equipment configured to provide connectivity to a client device on a communication network (e.g., a mobile device on a carrier network such as a 5G data network). For instance, a network anchor point may include or be associated with a particular access point such as a Packet Data Network (PDN) Gateway (PGW) that provides connectivity from the various client devices to external PDNs and serves as a primary or exclusive point of exit and entry for network traffic. In some examples, a network anchor point may perform policy enforcement, packet filtering, packet interception and screening, and/or other such operations. Accordingly, in some examples, all network traffic on the communication network may be routed to and from the client device by way of the network anchor point associated with the client device (e.g., assigned to the client device during an initialization process when the client device connects to the communication network, etc.).

To minimize transport latencies between a selected multi-access server and a client device in these examples, intelligent and efficient multi-access server orchestration may be configured to orchestrate service to be performed by multi-access servers that are more proximate to the network anchor point through which the traffic is routed than to the client device itself. For instance, in many situations, a geographic location of the client device and a geographic location of a network anchor point associated with the client device may be in close proximity to one another. In these situations, there may be little benefit to be derived from accounting for the difference in these locations. However, in other situations that will be described and illustrated below, the respective geographic locations of the client device and the network anchor point may not be in such close proximity to one another (e.g., a client device may be relatively remote from the geographic location of the network anchor point to which it has been assigned and through which its network traffic is routed). Accordingly, in these situations, significant benefits may arise from accounting for the geography of the network anchor point (e.g., by granting a greater weight to the location of the network anchor point than to the location of the client device itself, etc.) in the multi-access server orchestration for the client device, as will be shown herein.

In some examples, certain of these benefits may be achieved by determining and making use of service areas that correspond to respective network anchor points in the ways described herein. Using a service area of a network anchor point as described herein may not only ensure that the location of the network anchor point is accounted for instead of or in addition to the location of the client device as a multi-access server is selected, but may also help provide intelligent and efficient multi-access server orchestration in scenarios in which a particular network anchor point is not immediately proximate any particular multi-access server. Additionally, this service-area-oriented multi-access server orchestration may be implemented in a manner that accounts for various factors mentioned above (e.g., transport and processing latencies, performance parameters associated with the service request, server capabilities and performance, etc.) such that the orchestration will provide benefits of multi-access server orchestration mentioned above together with additional benefits arising from improved orchestration associated with client devices remote from network anchor points.

Various specific embodiments will now be described in detail with reference to the figures. It will be understood that the specific embodiments described below are provided as non-limiting examples of how various novel and inventive principles may be applied in various situations. Additionally, it will be understood that other examples not explicitly described herein may also be captured by the scope of the claims set forth below. Multi-access server orchestration methods and systems described herein may provide any of the benefits mentioned above, as well as various additional and/or alternative benefits that will be described and/or made apparent below.

FIG. 1 shows an illustrative multi-access server orchestration system 100 according to principles described herein. System 100 may be implemented by computer resources such as servers, processors, memory devices, storage devices, communication interfaces, and so forth. For example, system 100 may be included within or otherwise associated with one or more multi-access servers or other computing systems (e.g., MEC servers, cloud servers, local servers, etc.) described herein. As such, a computing system implementing system 100 may be configured to orchestrate distributed computing processes, to perform distributed computing services, and/or otherwise to orchestrate services to be provided by distributed computing resources to client devices such as mobile devices (e.g., cell phones, smartphones, tablet devices, etc.), desktop or laptop computers, Internet of Things (IoT) devices, and other user equipment (UE) devices as may serve a particular implementation.

As shown, system 100 may include, without limitation, a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 may also be included within system 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner. Instructions 106 may be executed by processor 104 to cause system 100 to perform any of the functionality described herein. Instructions 106 may be implemented by any suitable application, software, code, and/or other executable data instance. Additionally, memory 102 may also maintain any other data accessed, managed, used, and/or transmitted by processor 104 in a particular implementation.

Processor 104 may be implemented by one or more computer processing devices, including general purpose processors (e.g., central processing units (CPUs), graphics processing units (GPUs), microprocessors, etc.), special purpose processors (e.g., application-specific integrated circuits (ASICs), field-programmable gate arrays (FPGAs), etc.), or the like. Using processor 104 (e.g., when processor 104 is directed to perform operations represented by instructions 106 stored in memory 102), system 100 may perform functions associated with multi-access server orchestration as described herein and/or as may serve a particular implementation.

Figure 2:
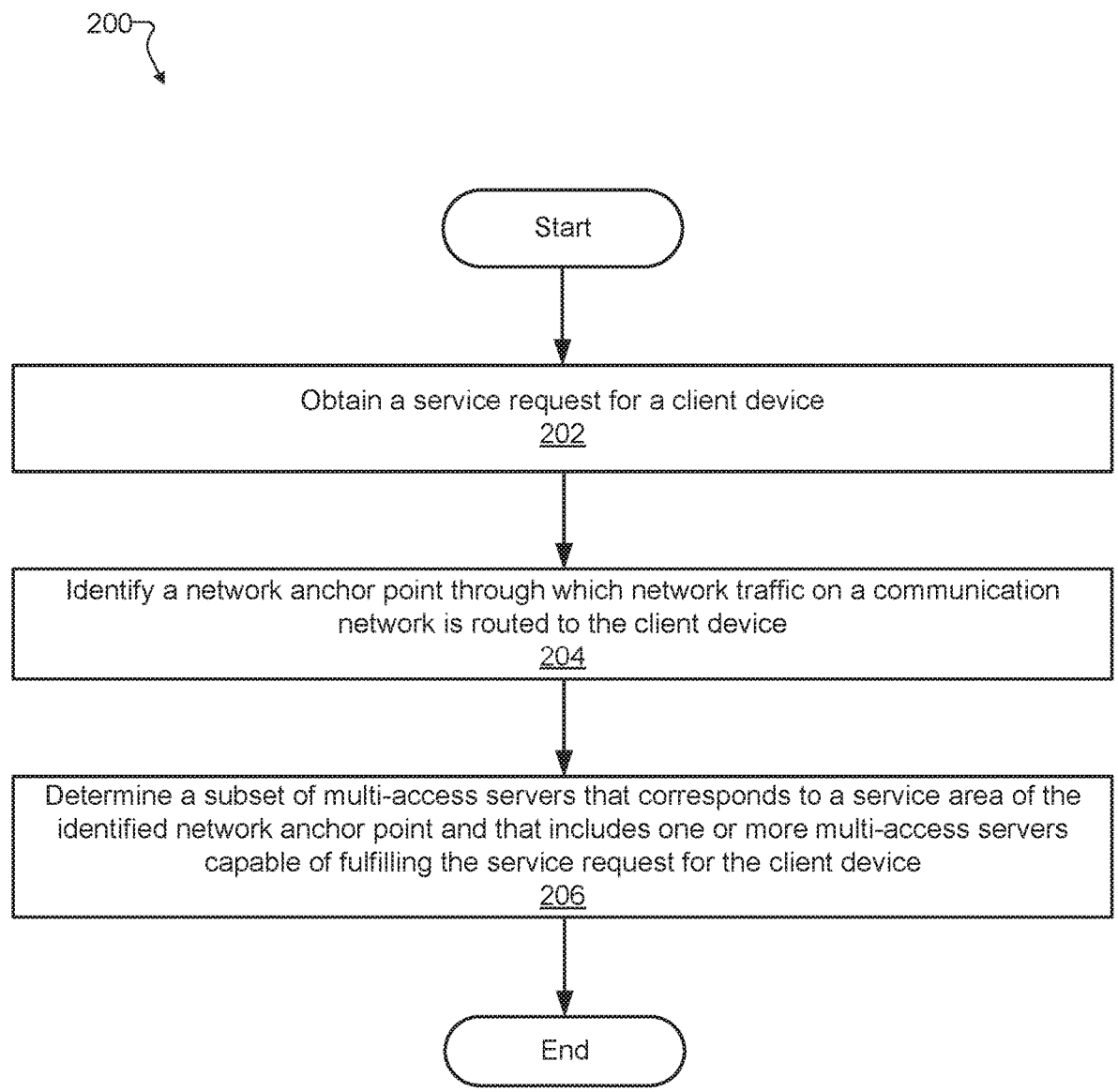
FIG. 2 shows an illustrative method for multi-access server orchestration according to embodiments described herein.

As one example of functionality that processor 104 may perform, FIG. 2 shows an illustrative method 200 for multi-access server orchestration in accordance with principles described herein. While FIG. 2 shows illustrative operations according to one embodiment, other embodiments may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by a multi-access server orchestration system such as system 100 and/or any implementation thereof.

In some examples, the operations of FIG. 2 may be performed in real-time so as to provide, receive, process, and/or use data described herein immediately as the data is generated, updated, changed, exchanged, or otherwise becomes available. As a result, system 100 may be configured to perform multi-access server orchestration described herein on demand (e.g., orchestrating service to be provided by multi-access servers to client devices immediately upon request). Additionally, as will be described in more detail below, the service orchestrated in these ways may be based on real-time conditions of multi-access servers (e.g., real-time performance of the servers, real-time availability of resources, etc.), real-time conditions of the communication network, real-time conditions of client devices requesting data services, and so forth. In these examples, real-time operations will be understood to refer to operations performed immediately and without undue delay, even if it is not possible for there to be absolutely zero delay. Similarly, real-time conditions will be understood to refer to conditions as they exist approximately at the moment in time when decisions are being made and operations are being performed (e.g., even if after a short delay) such that the determined conditions continue to be relevant to the decisions being made and/or the operations being performed.

At operation 202, system 100 may obtain a service request for a client device. For example, the service request may be obtained by way of a communication network within which system 100 is implemented or with which system 100 otherwise corresponds. The communication network may include a provider network provided by a carrier that provides wireless connectivity and data services to the client device by way of an array of wireless connection points and multi-access servers implemented within the provider network (e.g., MEC servers within the provider network) or otherwise communicatively coupled to the provider network (e.g., cloud servers outside of the provider network and accessible by way of the provider network).

In certain examples, the service request obtained at operation 202 may indicate a client identity of the client device by including any type of client identifier as may serve a particular implementation. For example, the service request may include a network address (e.g., an IP address) that was assigned to the client device when the client device was initialized with the communication network (e.g., when the client device was powered on and connected to the communication network, when the client device was switched out of airplane mode to reconnect to the communication network, etc.). Additionally or alternatively, the service request may include another type of client identifier such as an international mobile equipment identity (IMEI) or other such identifier. As will be described in more detail below, the client identifier of the client device may be associated with a particular network anchor point. For example, a network address may be directly indicative of the network anchor point, while other types of client identifiers (e.g., IMEIs, etc.) may be indirectly used to identify the network anchor point by, for instance, allowing for lookup of a network address that is correlated to the client identifier and that is itself associated with the network anchor point.

The service request may also represent a request for orchestration of service to be provided to the client device by a multi-access server that is to be selected from a set of multi-access servers associated with the communication network. For example, the set of multi-access servers may include MEC servers mentioned above to be implemented within a provider network of the communication network, cloud servers mentioned above to be accessible by way of the provider network, and so forth. The service that the client device requests to be orchestrated may be associated with an application that is executing on the client device and that is configured to leverage distributed computing resources to operate efficiently and effectively. Such applications may include, for instance, video game applications and/or extended reality (e.g., virtual reality, augmented reality, etc.) applications that utilize powerful multi-access server resources to efficiently and effectively perform complex graphics rendering and other intensive processing, communication applications that utilize multi-access servers as communication hubs to allow users to communicate with one another (e.g., for an audio or video business conference call, for a virtual event such as a virtual wedding or graduation, etc.), and various other types of applications that use distributed computing resources of multi-access servers in various other ways.

At operation 204, system 100 may identify a network anchor point through which network traffic on the communication network is routed to the client device. For example, the network anchor point may be identified at operation 204 in response to the obtaining of the service request at operation 202 and based on the client identity of the client device indicated by the obtained service request. Because different network anchor points at different geographical locations may be associated with different groups of potential network addresses, a network address that has been assigned to a particular client device may indicate or be suggestive of which network anchor point the client device was nearest to when the client device was initialized with respect to the communication network. Accordingly, a client identifier that either comprises the network address or is correlated with the network address (e.g., in a manner that allows the network address to be looked up based on based on the client identifier) may allow system 100 to identify the network anchor point based on the client identity.

For instance, if a particular network anchor point is located in City A and the client device initializes (e.g., is connected to the communication network after being powered on or taken out of airplane mode, etc.) in City A, the network address assigned to the client device may be associated with the geographical location of City A and network traffic routed to the client device may be routed through the network anchor point in City A. If the client device later moves to a City B that is remote from City A and that includes its own network anchor point, the client device may continue to have the network address associated with City A (e.g., in order to provide session continuity) at least until the client device is disconnected from and reconnected and reinitialized to the communication network (e.g., until the device is power cycled or taken into and out of airplane mode, etc.). Accordingly, situations may arise in which network traffic to a client device located within City B may be routed through a network anchor point located in remote City A. As will be described and illustrated in more detail below, system 100 may recognize and account for such situations to improve multi-access server orchestration by facilitating selection of a multi-access server within City A (e.g., near the network anchor point) rather than a multi-access server within City B (e.g., near the client device itself).

At operation 206, system 100 may determine a subset of multi-access servers from the set of multi-access servers. For example, the subset of multi-access servers may correspond to a service area of the identified network anchor point, and may include one or more multi-access servers capable of fulfilling the service request for the client device. For instance, referring again to the example above involving City A and City B, the subset of multi-access servers may be located in and around City A (e.g., within a service area determined for the network anchor point in City A) rather than in and around City B (e.g., despite the location of the client device being within City B).

In some examples, the subset of multi-access servers determined at operation 206 may account for various parameters, capabilities, resources, and real-time conditions of multi-access servers, service requests, client devices, the communication network, and so forth in order to determine which multi-access servers are capable of fulfilling the service request for the client device and, hence, which multi-access servers are to be included within the service area subset. Additionally, in certain examples, system 100 may order the multi-access servers in the subset (e.g., the multi-access servers determined to be included within the service area of the network anchor point) based on processing capabilities and real-time conditions of the multi-access servers in the subset. For instance, this ordering may include prioritizing the servers in an in order of priority from a most-preferred to a least preferred multi-access server in the service area. System 100 may also provide a representation of the ordered or unordered subset to the client device (e.g., to thereby allow the client device to intelligently and efficiently select a multi-access server to fulfill the service request) and/or perform any other service orchestration operation described herein.

In certain examples, the network address of a client device may be based on an initialization location of the client device (e.g., a location at which the client device was located during an initialization of the client device with respect to the communication network). In these examples, the network anchor point identified based on the client identity (e.g., the network address) may be at a geographic location proximate to the initialization location of the client device, which may or may not be proximate to the current location of the client device when the service request is generated. System 100 may determine the subset of multi-access servers in such examples by selecting multi-access servers for inclusion in the subset based on geographic proximity of the multi-access servers to the geographic location of the network anchor point. As such, in some instances, a geographic location of at least one of the multi-access servers selected for inclusion in the subset may be more proximate to the geographic location of the network anchor point than to a geographic location of the client device at a time when the service request is obtained. Various scenarios illustrating these principles will be described and illustrated below.

Figure 3:
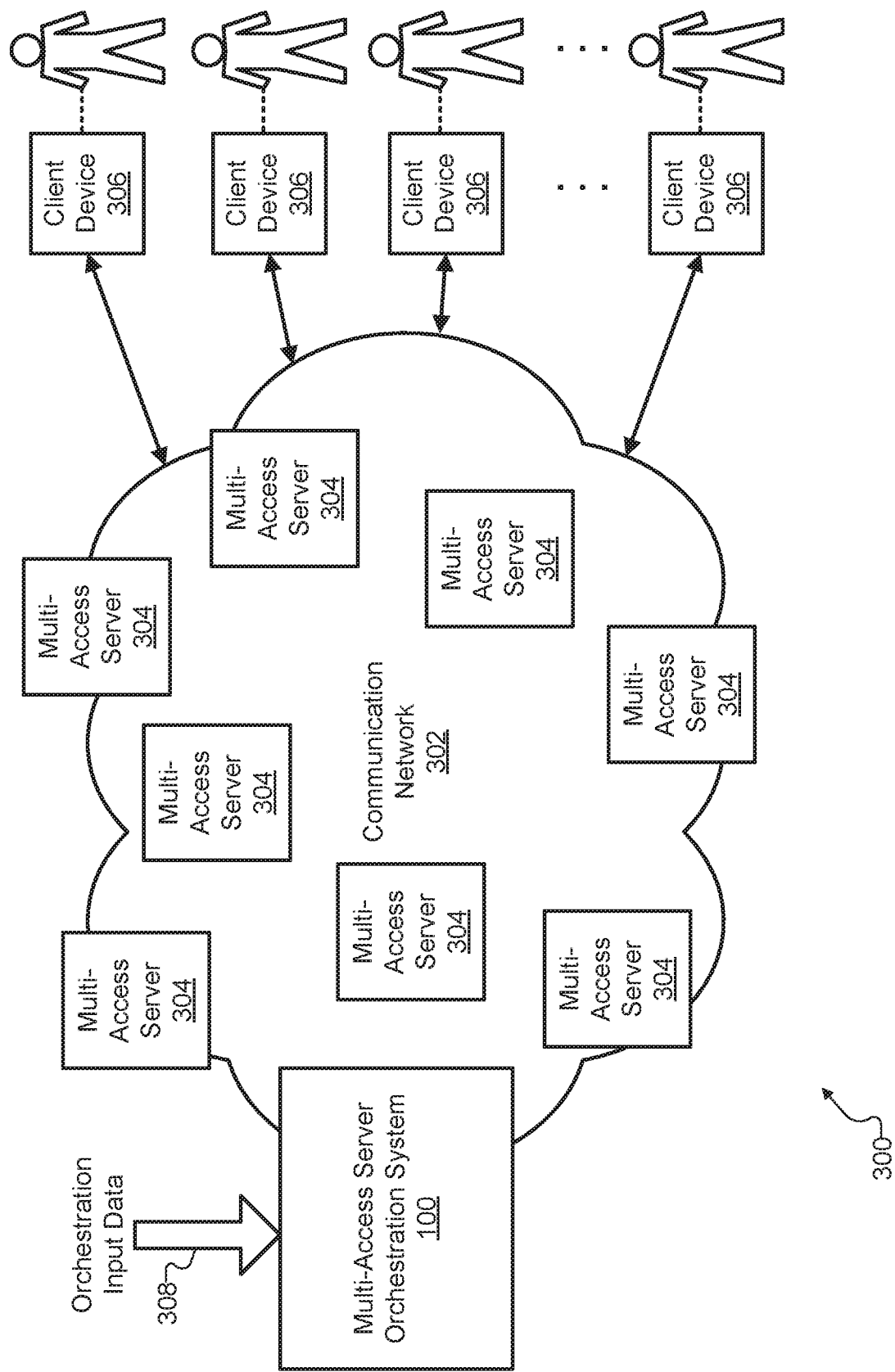
FIG. 3 shows an illustrative configuration in which the multi-access server orchestration system of FIG. 1 may operate according to embodiments described herein.

FIG. 3 shows an illustrative configuration 300 in which system 100 may operate according to principles described herein. As shown, system 100 may be implemented within a communication network 302 along with a set of multi-access servers 304 distributed throughout communication network 302. Various client devices 306 each associated with a respective user may be communicatively coupled to communication network 302 in a manner that allows for the client devices to request service from any of a set of multi-access servers 304. Accordingly, system 100 may be tasked with orchestrating and/or otherwise facilitating such data services, and may be implemented in various ways described above to perform a variety of orchestration operations described herein (e.g., including the operations of method 200 described above).

Communication network 302 may represent various networks or parts of networks used to enable data communication between client devices 306 and multi-access servers 304 or other servers that may communicate with client devices 306. To this end, communication network 302 may implement or employ any suitable communication technologies, devices, media, protocols, or the like as may serve a particular implementation. In some examples, communication network 302 may include a provider network and/or additional networks outside of the provider network (e.g., external networks associated with the Internet).

A provider network included within communication network 302 may be implemented as a provider-specific wired or wireless communications network (e.g., a cellular network used for mobile phone and data communications, a 5G network or network of another suitable technology generation, a cable or satellite carrier network, a mobile telephone network, a traditional telephone network, etc.), and may be operated and managed by a provider entity such as a mobile network operator (e.g., a wireless service provider, a wireless carrier, a cellular company, etc.). The provider of the provider network may own or control all of the elements necessary to deliver communications services to users of user equipment devices such as client devices 306, including radio spectrum allocation, wireless network infrastructure, back haul infrastructure, customer care, provisioning of devices, and so forth.

In various examples, a provider network included within communication network 302 may include or consist of various network resources that may be associated with one or more multi-access servers 304 such as MEC servers. For instance, one or more radio access network (RAN) resources may directly communicate with client devices 306 and may provide access to MEC servers integrated with the RAN resources, one or more transport access point (TAP) resources may communicate with client devices 306 indirectly (e.g., by way of the RAN resources) and may provide access to additional integrated MEC servers, one or more service access point (SAP) resources may communicate with client devices 306 indirectly (e.g., by way of the RAN and/or TAP resources) and may provide access to still other integrated MEC servers, and so forth. In all of these examples, the MEC servers integrated within the network resources may implement multi-access servers 304 shown in configuration 300. Additionally, in some examples, other network resources may likewise assist in providing communication services for client devices 306 and/or may provide access to MEC servers or other multi-access servers 304 in any manner as may serve a particular implementation.

Along with a provider network such as has been described, communication network 302 may further include elements of one or more additional networks external to the provider network (e.g., third party networks associated with the Internet, etc.). Access to additional multi-access servers 304 (e.g., cloud servers, etc.) beyond the MEC servers of the provider network may be provided by these additional networks. Certain additional network elements within communication network 302 may be included within peer networks connected to the provider network by high bandwidth connections (e.g., direct fiber optic lines, etc.), such that certain multi-access servers 304 may be operated on the peer networks. Other network elements of communication network 302 may be associated with networks external to the provider network, such that other multi-access servers 304 may be implemented by cloud servers operated by cloud computing enterprises such as VERIZON (e.g., VERIZON Cloud), AMAZON (e.g., AMAZON Web Services (AWS)), MICROSOFT (e.g., MICROSOFT Azure), GOOGLE (e.g., GOOGLE Cloud Platform (GCP)), ORACLE (ORACLE Cloud), or the like.

Each multi-access server 304 may be implemented by a computing system (e.g., a server, a blade server, an edge server, a set of servers at a single site, etc.) that includes a respective set of computing resources, that is accessible to multiple client devices 306 separate from the multi-access server 304, and that is configured to perform processing and data services for the client devices 306. As mentioned above, multi-access servers 304 implemented within a provider network of communication network 302 (e.g., so as to be near the edge of communication network 302 where client devices 306 connect to the network) may be referred to as MEC servers, while other multi-access servers 304 implemented further from the edge of the provider network (e.g., within external networks that are accessible to client devices 306 by way of the provider network) may be referred to as cloud servers.

The communicative and geographical proximity of a multi-access server 304 to a client device 306 being served may at least partially determine the performance that the multi-access server 304 is capable of providing. For instance, multi-access servers 304 located near client devices 306 (e.g., MEC servers) are generally capable of performing data services with a lower latency than multi-access servers 304 that are located farther away from client devices 306 (e.g., cloud servers). A particular multi-access server 304 may include a set of co-located computing resources (e.g., processors, CPUs, GPUs., memory, communication resources, etc.) such that the computing resources all communicate with a particular client device 306 with a similar transport latency and such that the particular multi-access server 304 may be treated as a single, discrete entity for the purposes of multi-access server orchestration by system 100.

Each client device 306 may be implemented as any computing device configured to connect to communication network 302 and to request and/or receive processing and data services from one or more multi-access servers 304 by way of communication network 302. As shown, certain client devices 306 may be associated with one or more users. For example, a client device 306 implemented as a personal computer (e.g., a desktop or laptop computer, etc.) or a mobile device (e.g., a smartphone or tablet device, etc.) may be controlled by a user of the client device 306. Other types of client devices (e.g., certain IoT devices and embedded systems such as may be employed in smart appliances, specialized testing or automation equipment, etc.) may not be associated with a specific user, or may be one of many client devices controlled by a single user.

As will be described in more detail below, in operation, system 100 may receive orchestration input data from a variety of sources and may use that data to orchestrate a service to be performed by one or more multi-access servers for the benefit of one or more client device 306 in accordance with principles described herein. Orchestration input data 308 may include service requests provided by client devices 306, as well as other input data such as performance data, performance parameters, resource data, network anchor point data, and so forth. Such input data may be provided by multi-access servers 304, network anchor points (not explicitly shown in FIG. 3), and/or any other devices or systems as may serve a particular implementation.

Figure 4:
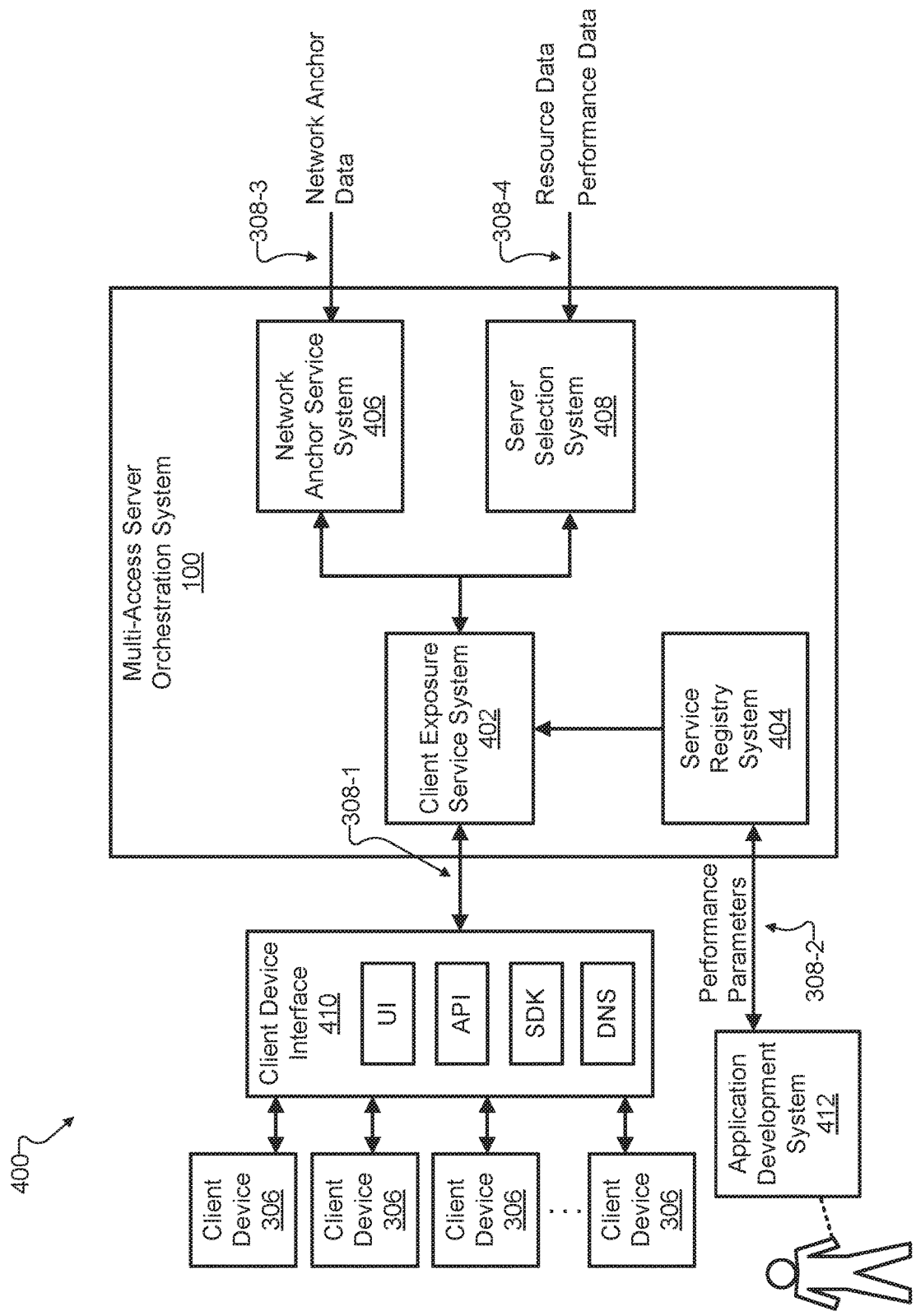
FIG. 4 shows an illustrative block diagram of how various component parts interoperate to implement and provide data to the multi-access server orchestration system of FIG. 1 according to embodiments described herein.

FIG. 4 shows an illustrative block diagram 400 depicting how various component parts may interoperate to implement one particular implementation of system 100. Specifically, this implementation of system 100 is shown to include component parts such as a client exposure service system 402, a service registry system 404, a network anchor service system 406, and a server selection system 408. In certain examples, each of systems 402-408 may be implemented by a discrete computing system having a discrete set of computing resources (e.g., its own processor or processors, its own memory, its own storage space, etc.). In other examples, one or more of system 402-408 may be implemented within a single computing system (e.g., such that resources of each system are shared by one or more other systems). Block diagram 400 further illustrates various specific instances of orchestration input data 308 (e.g., input data 308-1 through 308-4) that may be provided to the component parts of system 100 by systems and components implemented externally to system 100.

Client exposure service system 402 may be configured to (e.g., may include one or more unique or shared processors configured to) obtain a service request for a client device. For example, input data 308-1 may include such a service request. A given service request included within input data 308-1 may originate within one of client devices 306 (described above) or within another suitable system configured to manage service requests for the client devices. As shown, client devices 306 may provide service requests by way of various different interfaces represented in a client device interface 410 illustrated between client devices 306 and client exposure service system 402. It will be understood that each client device may implement one or more of the interfacing protocols or methodologies represented in client device interface 410, and that the interfacing may be performed in certain implementations by the client device 306 itself, rather than by a separate interfacing entity. As depicted in client device interface 410, systems, protocols, and methodologies that may be employed by certain client devices 306 to generate and transmit service requests to client exposure service system 402 may include a user interface (UI) (e.g., a text-based or graphical user interface), an application programming interface (API), a software development kit (SDK), a domain name system (DNS), and/or any other suitable systems, protocols, and/or methodologies as may serve a particular implementation.

Regardless of which type of client device interface is used to transmit the service request, client exposure service system 402 may obtain the service request within input data 308-1 and may parse the request to obtain certain data and/or instructions. For example, the service request may indicate a client identity (e.g., a network address such as an IP address, an IMEI or serial number that may be used to identify the network address, etc.) of the client device 306 that transmitted the service request and client exposure service system 402 may parse and identify a client identifier representative of the client identity from the service request. The service request may also include data representing a request for orchestration of service to be provided to the requesting client device 306 by a particular multi-access server (e.g., by one of multi-access servers 304 from the set of multi-access servers 304 associated with communication network 302). As will be described in more detail below, additional data such as identifiers for one or more specifically requested multi-access servers, or other such data may also be included within input data 308-1 (e.g., within the service request).

While not explicitly shown in FIG. 4, it will be understood that input data 308-1 and the service request included therein may be obtained by client exposure service system 402 by way of a communication network such as communication network 302 described above. For example, a client device 306 may transmit the service request over communication network 302 using any of the systems, protocols, or methodologies associated with client device interface 410.

Service registry system 404 may be communicatively coupled to client exposure service system 402 by way of communication network 302 or by way of another suitable communicative link. Service registry system 404 may be configured to (e.g., may include one or more unique or shared processors configured to) provide performance parameters associated with multi-access server capabilities necessary or desirable for fulfilling a service request for a client device. For example, as shown, input data 308-2 may be received from an application development system 412 associated with a user such as a developer of the application. Performance parameters registered within service registry system 404 may include any suitable parameters indicative of computing resources that an application associated with a service request is configured to use (e.g., performance requirements, performance recommendations, etc.). For example, the performance parameters may indicate that a particular number of CPUs and/or GPUs are required or recommended for proper performance of the application. In other examples, performance parameters may define required and/or recommended latency parameters (e.g., round-trip and/or one-way latency parameters, transport and/or processing latency parameters, etc.), processing abilities (e.g., CPU speed, etc.), memory and/or disk space requirements and/or recommendations, communication requirements and/or recommendations (e.g., uplink and/or downlink bandwidth parameters, etc.), tolerable packet loss and/or jitter parameters for the application, or other suitable parameters.

These and/or various other types of performance parameters may be defined by the developer of a particular application based on the unique characteristics and needs of the application. As such, the developer may use application development system 412, which may be a development device implemented by any of the types of devices or servers described herein, to register the performance parameters with service registry system 404. For example, service registry system 404 may interact with application development system 412 using a user interface or an API (e.g., a REST API) configured to serve a particular implementation. While only one application development system 412 is shown with one set of performance parameters in FIG. 4, it will be understood that input data 308-2 may represent performance parameters for each of various different applications defined by various different developers and received from various application development systems similar to application development system 412.

Network anchor service system 406 may be communicatively coupled to client exposure service system 402 by way of communication network 302 or by way of another suitable communicative link. Network anchor service system 406 may be configured to (e.g., may include one or more unique or shared processors configured to) identify respective network anchor points through which network traffic on communication network 302 is routed to the various client device 306. For example, in response to a service request received from a particular client device 306 (e.g., by way of client exposure service system 402) and based on a client identifier of the particular client device that is indicated in the service request (e.g., and that may be parsed out by client exposure service system 402 as described above), network anchor service system may determine which network anchor point the particular client device 306 is associated with out of all the network anchor points included within the communication network.

Input data 308-3 may include network anchor data stored within a data lake or other suitable data store configured to track, correlate, and store associations between particular network anchor points of the communication network and particular client identifiers (e.g., network addresses) that client devices 306 may be assigned. For instance, network anchor data 308-3 may indicate that network addresses within a certain range (e.g., IP addresses associated with certain subnets, etc.) may correspond to (e.g., may be designated to be served by) one particular network anchor point, while network addresses within another range may correspond to a different network anchor point. Network anchor data 308-3 may also indicate correlations between certain types of client identifiers (e.g., non-address identifiers such as IMEIs, serial numbers, etc.) and network addresses and/or assigned network anchor points. Thus, based on network anchor data received within input data 308-3 and based on the client identifier included within the service request, network anchor service system 406 may identify the particular network anchor point to which the client device 306 that is requesting service corresponds (e.g., the network anchor point through which network traffic on the communication network to and from the client device 306 is routed).

Server selection system 408 may be communicatively coupled to client exposure service system 402 and/or to network anchor service system 406 by way of communication network 302 or by way of another suitable communicative link. As such, server selection system 408 may be configured to (e.g., may include one or more unique or shared processors configured to) receive, from service registry system 404 by way of client exposure service system 402, performance parameters that have been registered for the application being requested by the client device 306. Server selection system 408 may also receive a network anchor point associated with the client device 306 from network anchor service system 406.

Along with receiving the performance parameters and the identified network anchor point, FIG. 4 shows that server selection system 408 may further receive input data 308-4 that includes performance and resource data associated with various multi-access servers 304 within the set of multi-access servers operating within network 302.

The resource data obtained by server selection system 408 as part of input data 308-4 may be indicative of hardware resources available to one or more multi-access servers 304 in the set of multi-access servers operative within communication network 302. For instance, resource data included within input data 308-4 may indicate how many CPU and/or GPU cores are included within each multi-access server 304, how much memory and/or disk capacity is included within each multi-access server 304, what communicative bandwidths (e.g., uplink bandwidths, downlink bandwidths, etc.) and capabilities each multi-access server 304 is configured to provide, and so forth. Because resource data is not dependent on current network conditions but rather what resources have been built into various multi-access servers and/or network components, this data may be stored and accessed from a database used to track these types of statistics for the network.

In contrast, the performance data obtained by server selection system 408 as part of input data 308-4 may be indicative of performance measurements for one or more multi-access servers 304 in the set of multi-access servers operating within communication network 302. For instance, performance data included within input data 308-4 may indicate how many CPU and/or GPU cores are currently available (e.g., rather than in use by other applications) within each multi-access server 304, how much memory and/or disk capacity is currently available within each multi-access server 304, what communicative bandwidths (e.g., uplink bandwidths, downlink bandwidths, etc.) and capabilities each multi-access server 304 is currently capable of providing for a requested application, and so forth. Unlike the resource data described above, performance data may be dependent on current network conditions and what processing and/or data services are already being provided when the client device 306 transmits the new service request. As such, performance data may be based on real-time data reported to indicate resource availability and/or real-time measurements of multi-access server performance rather than based on relatively static data maintained within a data store. In some examples, performance data may indicate measured latency performance (e.g., accounting for transport and/or processing latencies) of particular multi-access server 304 with respect to particular network anchor points and/or client devices 306.

Server selection system 408 may use any or all the various types of input data 308 described above to intelligently determine a subset of multi-access servers 304 that may serve as good candidates for fulfilling the service request that has been received from the client device 306. For example, using this data to account for application performance parameters, server resources and performance capabilities, real-time network conditions, and so forth, server selection system 408 may determine which multi-access servers 304 may be capable of adequately or favorably fulfilling the service request.

More specifically, server selection system 408 may be configured to determine a subset of the set of multi-access servers 304, wherein the subset corresponds to a service area of the identified network anchor point and includes one or more multi-access servers capable of fulfilling the service request for the client device 306. To this end, server selection system 408 may determine the subset of multi-access servers by selecting multi-access servers for inclusion in the subset based on the identified network anchor point and based on performance parameters provided by service registry system 404 (by way of client exposure service system 402). Moreover, the determining of the subset of multi-access servers may further include selecting multi-access servers 304 for inclusion in the subset based on the resource data and performance data obtained within input data 308-4.

Figure 5:
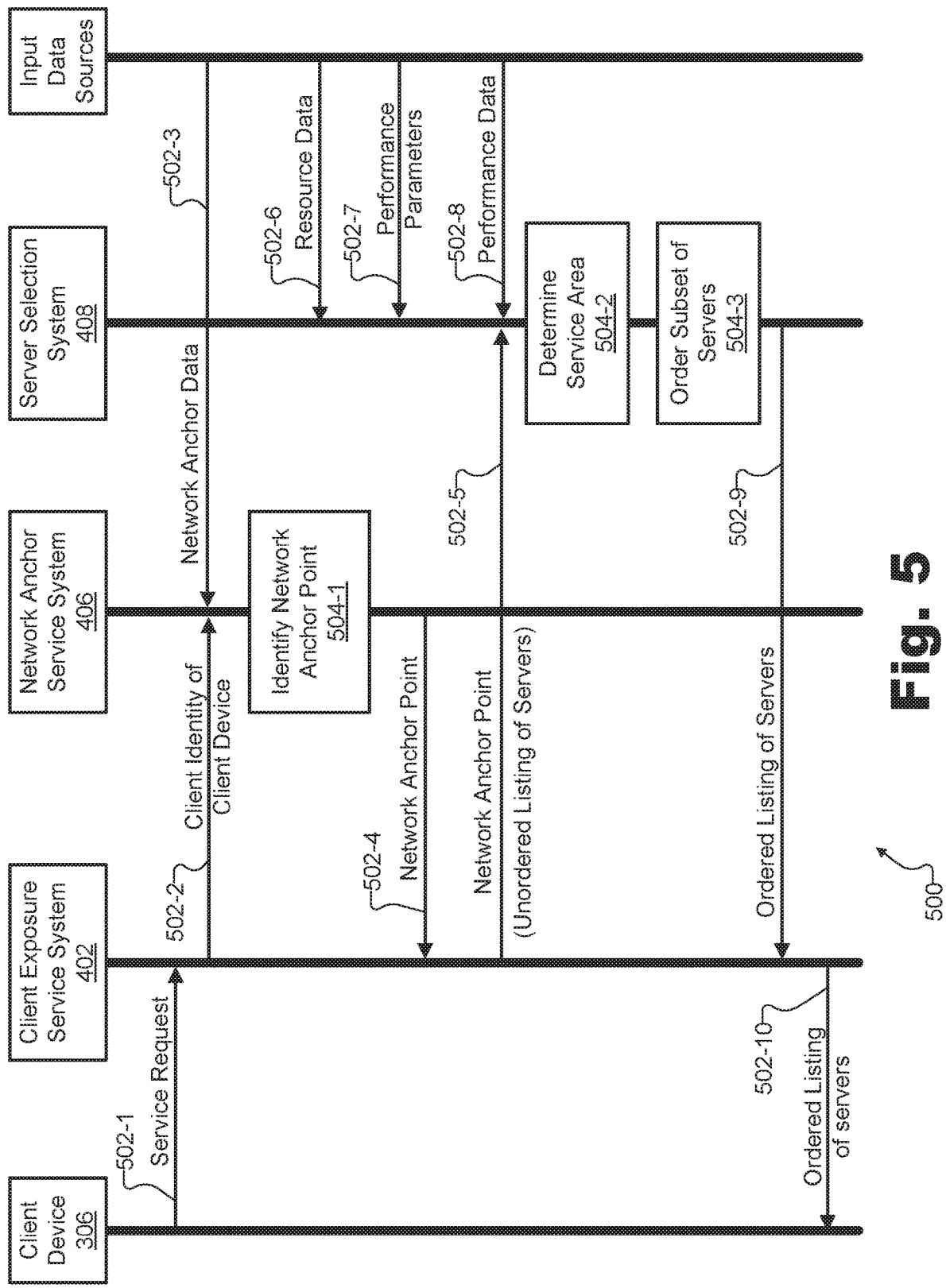
FIG. 5 shows an illustrative data flow including operations performed by components of the block diagram of FIG. 4 and communications between the components according to embodiments described herein.

To further illustrate how the subset of multi-access servers corresponding to the service area of an identified network anchor point may be performed, FIG. 5 shows an illustrative data flow 500 including various operations performed by components of block diagram 400 and communications between the components. Specifically, as shown, the components represented in data flow 500 include a particular client device 306 that is requesting orchestration of service to be provided by a suitable multi-access server, client exposure service system 402, network anchor service system 406, server selection system 408, and various input data sources (e.g., application development system 412 and/or service registry system 404 for providing performance parameters of input data 308-2, various suitable sources of input data 308-3 and 308-4 described above, etc.).

As time moves forward from the top of FIG. 5 to the bottom of FIG. 5, various communications 502 between the various component systems (e.g., communications 502-1 through 502-10) are shown along with various operations 504 that are performed by the component systems (e.g., operations 504-1 through 504-3). It will be understood that the order of communications 502 and operations 504 may vary from what is shown in data flow 500, as well as that certain communications 502 and/or operations 504 may be performed concurrently in certain examples. Moreover, additional or fewer communications and/or operations may be employed in certain examples than are shown in the example of data flow 500. It will also be understood that operations (e.g., processing performed by a particular component system) may accompany some or all of communications 502 even if such operations are not explicitly shown in FIG. 5. Each of communications 502 and operations 504 shown in FIG. 5 will now be described in more detail.

Data flow 500 may begin with communication 502-1 between client device 306 and client exposure service system 402. At communication 502-1, client devices 306 may send a service request to system 100 and, more particularly, to client exposure service system 402. For example, as described above, client device 306 may send the service request by way of client device interface 410 (e.g., using an API, SDK, UI, DNS, etc.). As described above, the service request of communication 502-2 may represent a request for orchestration of service to be provided to client device 306 by one of the multi-access servers 304 associated with communication network 302. To this end, the service request may indicate a client identifier (e.g., network address such as an IP address) of client device 306, as has been described. Additionally or alternatively, in certain examples, other types of client identifiers or other suitable data may be included in the service request. For instance, client device 306 may provide identification identifiers such as a MAC address, a serial number or other device identifier (e.g., an IMEI number), a current geographical location of the client device (e.g., determined by way of a global positioning system (GPS) sensor, network triangulation, etc.), a username and/or password, a digital certificate, and/or any other identification and/or authentication information as may serve a particular implementation.

In some examples, the service request may indicate one or more multi-access servers 304 of the set of multi-access servers such as preferred multi-access servers 304, multi-access servers 304 that the client device 306 has used previously, multi-access servers 304 that are known to be nearby client device 306, or the like. In some examples, as will be described below, server selection system 408 may use such a list of multi-access servers 304 when determining the subset of multi-access servers in the service area of the network anchor point and/or otherwise orchestrating selection of the multi-access server 304 that will ultimately fulfill the service request.

While communication 502-1 depicts a direct communication between client device 306 and client exposure service system 402, it will be understood that, in certain examples, client device 306 may communicate with client exposure service system 402 by way of one or more other system components. For instance, client device 306 may communicate with client exposure service system 402 by way of an gateway device (e.g., an API gateway) that may be configured to handle registration, identification, authentication, and/or other services for client device 306. In some such examples, client device 306 may transmit, prior to communication 502-1, an authentication request to the gateway device. In response to the authentication request, the gateway device may provide client device 306 an access token that allows client device 306 to thenceforward communicate with client exposure service system 402 by way of the gateway device (e.g., to send communication 502-1, etc.).

At communication 502-2 client exposure service system 402 provides the client identifier included within the service request of communication 502-1 to network anchor service system 406. For example, while not explicitly shown in data flow 500, client exposure service system 402 may parse the service request received at communication 502-1 to obtain the client identifier, then may pass the identifier on as part of communication 502-2. In certain examples, other data associated with the service request may also be identified (e.g., parsed) and transmitted by client exposure service system 402 to be received by network anchor service system 406 and/or other system components at this stage.

At communication 502-3, network anchor data 502-3 may also be sent to and received by network anchor service system 406. For example, communication 502-3 may occur prior to, subsequent to, or concurrently with communication 502-2, and may be initiated by any suitable input data source such as a system associated with a data store that maintains network data for various network anchor points operating within the communication network.

At operation 504-1, network anchor service system 406 may use the client identifier obtained by way of communication 502-2 and the network anchor data obtained by way of communication 502-3 to identify a network anchor point with which client device 306 is associated (e.g., a network anchor point through which network traffic on communication network 302 is routed to client device 306). Operation 504-1 may be performed in any suitable manner, such as by obtaining a network address based on the client identifier, identifying a range of network addresses within which the obtained network address is included, identifying a subnet of the network address, or the like, and then correlating this range or subnet with a particular network anchor point indicated in the network anchor data to be associated with the range or subnet.

At communication 502-4, the network anchor point identified at operation 504-1 may be provided to client exposure service system 402, which may then forward the identified network anchor point to server selection system 408 at communication 502-5. In examples in which a listing of multi-access servers has been provided with the service request, client exposure service system 402 may use the network anchor point to verify or modify the listing (e.g., to cull multi-access servers that are not suitably proximate to the network anchor point, etc.) and then may provide the listing of multi-access servers 304 together with the network anchor point at communication 502-5. At this point, any listing of servers may be unordered. That is, the order of multi-access servers 304 included within the listing may not yet be ordered from a most preferred to a least preferred multi-access server for the service area of the identified network anchor point (e.g., since that operation is to be performed later by server selection system 408, as described in more detail below with respect to operation 504-3). In certain examples (not explicitly shown), network anchor service system 406 may provide the identified network anchor point directly to server selection system 408 rather than providing the address by way of client exposure service system and communications 502-4 and 502-5 as shown in data flow 500.

As communications 502-4 and 502-5 and/or operation 504-1 are ongoing, server selection system 408 may receive various types of data that have been described above by way of communications from one or more input data sources. Specifically, as shown, communication 502-6 may include resource data indicative of hardware resources available to one or more multi-access servers 304, communication 502-7 may include performance parameters associated with multi-access server capabilities for fulfilling the service request for client device 306 (e.g., performance parameters designating recommended or required resource availability for a particular application that client device 306 is requesting to execute), and communication 502-8 may include performance data indicative of performance measurements for one or more multi-access servers 304.

The input data sources providing communications 502-6 through 502-8 may be implemented by any of the input data sources described above. For example, service registry system 404 may provide the performance parameters of communication 502-8 based on performance parameters that have previously been registered in service registry system 404 by application development system 412 in certain examples, while, in other examples, no performance parameters may be received or accounted for. A system or device having access to a data store that maintains resource data may provide the resource data of communication 502-6, while a system or device configured to make real-time performance measurements and/or maintain data representative of historical measurements may provide performance data of communication 502-8. In certain implementations, system 100 (e.g., server selection system 408 or another component of system 100) may use the network anchor point obtained at communication 502-5 to branch out and generate a latency matrix to various other network anchor points based on latency and performance data collected historically and in real time.

At operation 504-2, server selection system 408 may determine a subset of multi-access servers 304 corresponding to a service area of the identified network anchor point. For example, server selection system 408 may compare the latency matrix of the performance data with performance parameters received from service registry system 404 to generate a list of multi-access servers that are relatively proximate the network anchor point (e.g., even if not necessarily proximate to client device 306 in certain examples where client device 306 is remote from the network anchor point it is associated with) and that are capable of fulfilling the service request for client device 306. To determine the service area (e.g., to determine the subset of multi-access servers 304) at operation 504-2, server selection system 408 may utilize some or all of the data received in the previous communications 502 (e.g., including the network anchor point, the performance data, the resource data, the performance parameters, and so forth). In certain examples, operation 504-2 may base the service area on the unordered listing of multi-access servers provided by client device 306 and client exposure service system 402, or may otherwise take these servers into account.

Each of the multi-access servers 304 determined to be within the service area of the network anchor point and to be capable of fulfilling the service request may be a viable candidate for fulfilling the service request (e.g., for executing an application associated with the service request). However, the listing of multi-access servers 304 generated by operation 504-2 may not have any particular order (i.e., may not prioritize or indicate a superiority of any one multi-access server 304 over another).

To illustrate, FIG. 6A shows an unordered listing 602 of multi-access servers 304 that may be generated at operation 504-2. As shown, listing 602 may represent a service area of the network anchor point identified for the client device 306 shown in FIG. 5. For example, each of the six multi-access servers 304 listed on the different rows of listing 602 may represent a multi-access server 304 that has suitable resources and performance capabilities to fulfill the service request and that is relatively proximate to the network anchor point (e.g., proximate enough to satisfy latency parameters of the service request, etc.). In FIG. 6A, listing 602 shows generic codes representative of data in various categories that may be available to server selection system 408 as server selection system 408 performs operation 504-2.

Specifically, for example, a first column illustrated in FIG. 6A (Multi-Access Server ID) represents a multi-access server identifier that may be associated with each server. For instance, this column may represent IMEI numbers, MAC addresses, serial numbers, or other suitable identifiers for each multi-access server 304 in the service area subset. Illustrative codes "Serv1209," "Serv0521," "Serv0918," "Serv0129," "Serv0923," and "Serv1023" shown in listing 602 will be understood to represent any of these or other suitable types of multi-access server identifiers.

A second column illustrated in FIG. 6A (Geographic Location) represents a geographic location of each multi-access server 304 in the service area subset that may be received by server selection system 408 and used to determine and/or order the subset. In FIG. 6A, geographic locations of each server are represented by illustrative codes "Loc1209," "Loc0521," "Loc0918," "Loc0129," "Loc0923," and "Loc1023" that will be understood to correspond to multi-access servers having identifiers with like numbers (e.g., "Loc1209" will be understood to represent the geographic location of the multi-access server 304 having multi-access server identifier "Serv1209," and so forth). However, in various examples, the geographic locations may be implemented by geographic coordinates or any other suitable data suitable for indicating a geolocation.

A third column illustrated in FIG. 6A (Server Resources) represents respective resources with which each multi-access server 304 in the service area subset may be equipped. As with the geographic locations, server selection system 408 may receive this data and utilize it to determine and/or order the multi-access servers in the subset. In FIG. 6A, respective sets of server resources for each server are represented by illustrative codes "Res1209," "Res0521," "Res0918," "Res0129," "Res0923," and "Res1023" that will be understood to correspond to multi-access servers having identifiers and locations with like numbers (e.g., "Res1209" will be understood to represent the set of resources included within the multi-access server 304 at geographic location "Loc1209" and having multi-access server identifier "Serv1209," etc.). However, in various examples, resource data representing the resources and/or capabilities of a particular multi-access server (e.g., the number of CPUs and/or GPUs included within the server, the amount of memory and disk space in the server, etc.) may be implemented by any type of data suitable for indicating a particular resource.

A fourth column illustrated in FIG. 6A (Server Performance) represents respective performance capabilities that have been determined or measured for each multi-access server 304 in the service area subset. As with the geographic locations and server resource data, server selection system 408 may receive this performance data and utilize it to determine and/or order the multi-access servers 304 in the subset. In FIG. 6A, respective sets of server resources for each server are represented by illustrative codes "Perf1209," "Perf0521," "Perf0918," "Perf0129," "Perf0923," and "Perf1023" that will be understood to correspond to multi-access servers represented using like numbers (e.g., "Perf1209" will be understood to represent the measured performance of the multi-access server 304 having the set of resources "Res1209," being located at geographic location "Loc1209," and having multi-access server identifier "Serv1209," etc.). However, in various examples, resource data representing the measured and/or estimated (e.g., theoretical, calculated, etc.) performance of a particular multi-access server (e.g., overall round trip latency that the server can provide, etc.) may be implemented by any type of data suitable for indicating a particular type of server performance (e.g., latency performance, processing performance, etc.).

Returning to FIG. 5, at operation 504-3, server selection system 408 may order the multi-access servers 304 included within the subset (e.g., the multi-access servers shown within listing 602 to be within the service area of the network anchor point associated with client device 306). For example, server selection system 408 may order the multi-access servers 304 to form an ordered listing of multi-access servers from a most-preferred to a least-preferred multi-access server for fulfilling the service request.

To illustrate, FIG. 6B shows an ordered listing 604 of multi-access servers 304 that may be generated at operation 504-3. As with listing 602, listing 604 may represent the service area of the network anchor point identified for the client device 306 shown in FIG. 5. However, whereas listing 602 listed the multi-access servers 304 in no particular order, listing 604 is shown to include an additional column (Order of Preference) that indicates a relative preference of each multi-access server 304 with respect to the others (e.g., prioritizing the most ideal candidate for fulfilling the service request down to the least ideal candidate in the subset). As shown, when the subset is ordered in this example, the multi-access server having identifier "Serv0923" at geographic location "Loc0923" may be determined to be the most-preferred multi-access server of the six servers in the service area subset, while the multi-access server having identifier "Serv0521" at geographic location "Loc0521" may be determined to be the least-preferred multi-access server of the six.

Just as any of the data received by server selection system 408 may be used to determine which multi-access servers to include in the subset at operation 504-2, any or all of this same data may also be used by server selection system 408 to perform the ordering of the servers at operation 504-3. For example, server selection system 408 may determine respective geographic locations of each multi-access server 304 in the subset (e.g., included within listing 602) and perform the ordering based on the respective geographic locations. As another example, server selection system 408 may obtain performance data indicative of performance measurements (e.g., latency times, processing speeds, etc.) for the multi-access servers 304 in listing 602 and perform the ordering of the multi-access servers at operation 504-3 to form ordered listing 604 based on the obtained performance data.

In certain implementations, system 100 may determine a first geographic location of a first multi-access server in the subset and a second geographic location of a second multi-access server in the subset. For instance, the first geographic location may be more proximate to a geographic location of the network anchor point than to a geographic location of the client device 306 at a time when the service request is obtained. In some examples, the second geographic location may be more proximate to the geographic location of the client device 306 at the time when the service request is obtained than to the geographic location of the network anchor point. In these circumstances, the ordering of the multi-access servers included within the subset to form ordered listing 604 may include ordering, based on the first and second geographic locations, the first multi-access server to be more highly preferred for fulfilling the service request than the second multi-access server.

Returning again to FIG. 5, at communications 502-9 and 502-10, server selection system 408 may provide ordered listing 604 to client device 306 by way of the communication network and as a response to the service request initially included within communication 502-1. More particularly, server selection system 408 may provide the ordered listing of servers (i.e., listing 604) to client exposure service system 402 at communication 502-9, and client exposure service system 402 may provide the ordered listing to client device 306 at communication 502-10. Equipped with ordered listing 604, client device 306 may proceed with efficiently selecting an optimal multi-access server 304 to fulfill its service request (e.g., by selecting the most-preferred server of listing 604 if possible, selecting the second most preferred server if the most preferred server is unavailable, and so forth) and the orchestration of a multi-access server by system 100 may be complete for this particular service request and this particular client device 306.

As mentioned above, in certain network service orchestration situations, a client device 306 may be located relatively proximate to a network anchor point to which the client device is assigned and the network anchor point may be relatively proximate to a multi-access server 304 capable of fulfilling a service request of the client device. In these situations, multi-access server orchestration methods and systems described herein may designate the proximate multi-access server 304 as the most-preferred server.

Figure 7:
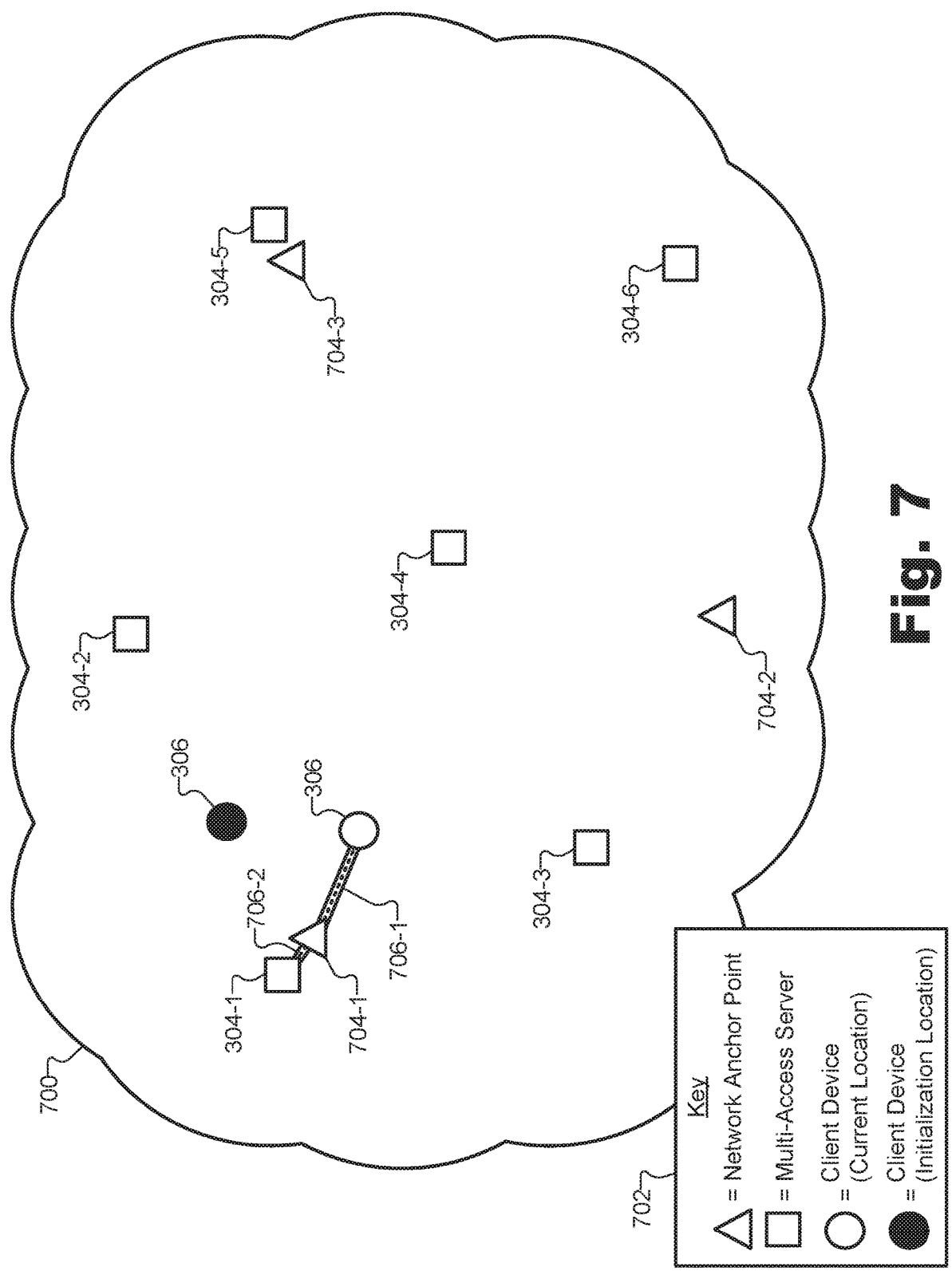
FIGS. 7-9 show illustrative orchestrations of service to be provided by different multi-access servers to a client device by way of a communication network according to embodiments described herein.

To illustrate, FIG. 7 shows an example orchestration of service that is to be provided by a particular multi-access server 304 to a particular client device 306 by way of a communication network such as communication network 302. Specifically, as shown, a coverage area 700 of communication network 302 (e.g., representing all or a portion of the entire geographic area covered by the network) is shown to include, as indicated by a key 702 in the bottom left corner of FIG. 7, a particular client device 306 illustrated by a circle shape, a plurality of multi-access servers 304 (e.g., multi-access servers 304-1 through 304-6) illustrated by square shapes, and a plurality of network anchor points 704 (e.g., network anchor points 704-1 through 704-3) illustrated by triangle shapes.

While FIG. 7 shows two different circles representative of the location of the client device 306, it will be understood that these circles represent the same client device 306 at two different times, namely, when the client device 306 is initialized by being powered on or taken out of airplane mode or the like (indicated by a black circle), and at a time (e.g., a current time) when the client device 306 is submitting a service request (indicated by a white circle). As such, the black circle indicates the location of the client device 306 when initialized (Initialization Location) while the white circle indicates the location of the client device 306 later when requesting service (Current Location). Each of the shapes shown in FIG. 7 will be understood to represent geographic locations of their respective objects (as indicated in key 702), and FIGS. 8 and 9 will be understood to use the same shapes to similarly represent the relative geography of these systems and devices as additional scenarios are illustrated.

In FIG. 7, the initialization location of the client device 306 (i.e., the black circle) is shown to be closer to network anchor point 704-1 than to any other network anchor point within coverage area 700. Accordingly, network anchor point 704-1 may be assigned as the network anchor point associated with the client device 306 and all network traffic to and from the client device 306 may be routed through network anchor point 704-1, as shown by traffic flows 706-1 and 706-2 between the client device 306 and multi-access server 304-1. Because network anchor point 704-1 is proximate to multi-access server 304-1 (e.g., representing a relatively low latency performance for traffic routed between multi-access server 304-1 and the client device 306), it may be clear that multi-access server 304-1 is the most preferred multi-access server to fulfill the service request of the client device 306 at the current location as long as the server is capable and available.

Figure 8:
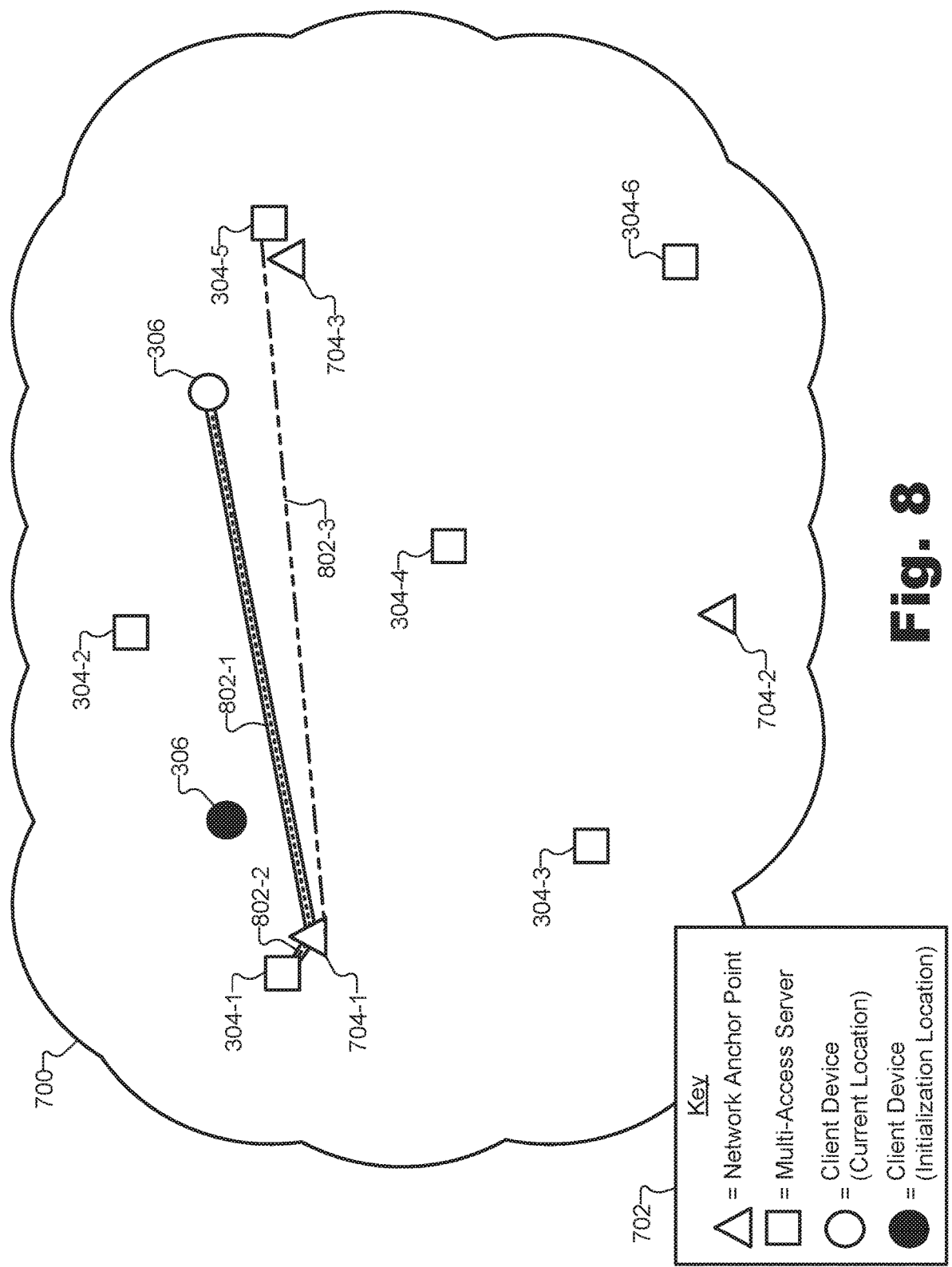
Figure 9:
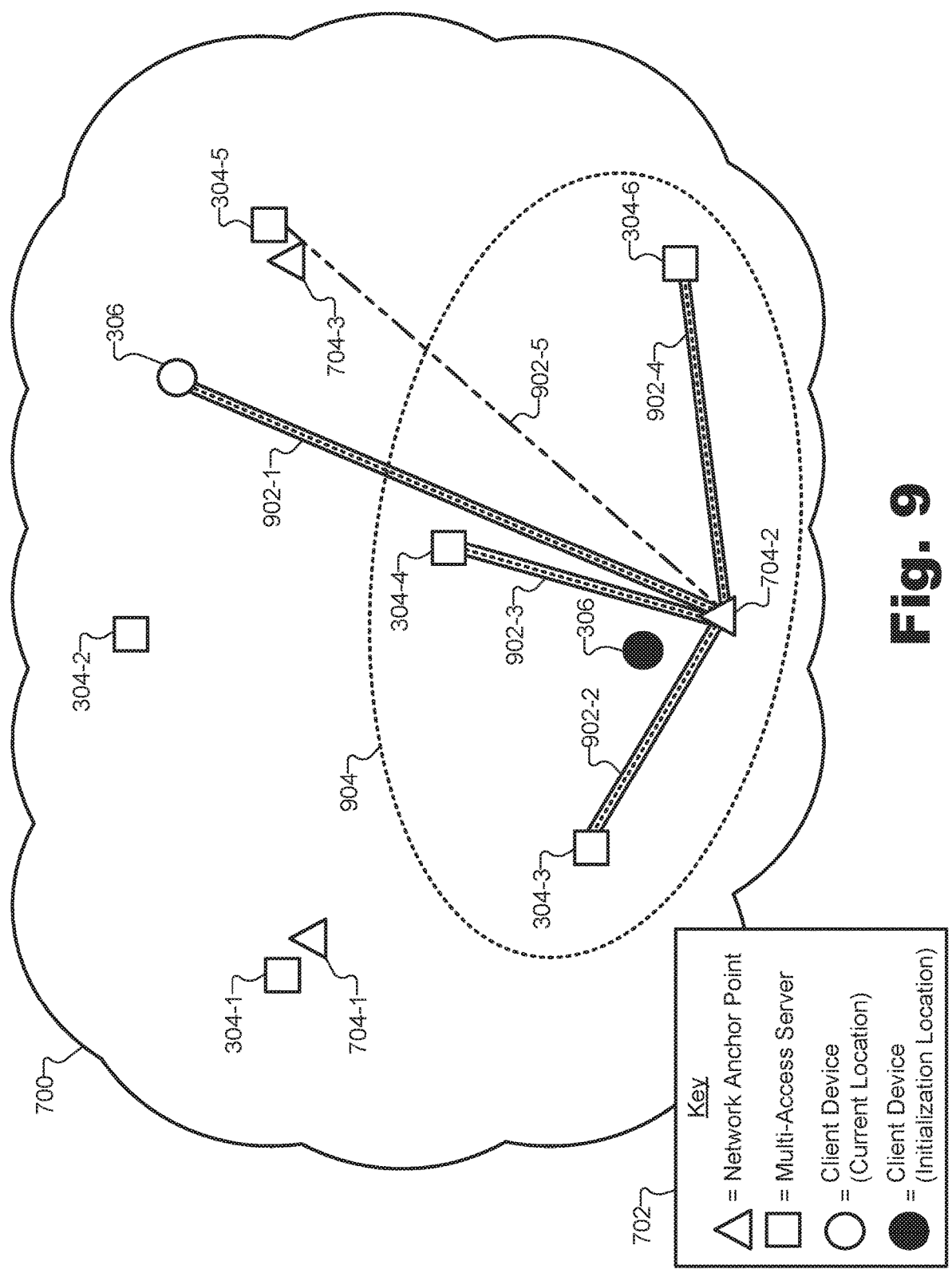

The relatively straightforward scenario shown in FIG. 7 may be common under most circumstance. Other types of scenarios (e.g., special-case scenarios that may be more complex, less common, etc., than the scenario of FIG. 7), however, may present much less straightforward circumstances and, as such, may not be well served by orchestration algorithms that neglect to account for network anchor point geography. FIGS. 8 and 9 illustrate two such special-case scenarios.

In FIG. 8, a client device 306 is shown to initialize at one location (e.g., the location of the black circle in FIG. 8) and then to move to a significantly different location (e.g., the location of the white circle in FIG. 8) by the time that the client device 306 provides the service request. As with the example of FIG. 7, network anchor point 704-1 may be assigned to the client device 306 at the time of initialization as a result of the close proximity of client device 306 to network anchor point 704-1 at that time (i.e., because network anchor point 704-1 is closer to the initialization location than any other network anchor point 704 within coverage area 700). In contrast to the example of FIG. 7, however, in the example of FIG. 8, the client device 306 is shown to have moved closer to another network anchor point 704 (i.e., network anchor point 704-3 in this example) than to the original network anchor point 704 to which it is assigned (i.e., network anchor point 704-1 in this example). In some circumstances, such a movement may trigger the client device 306 to be reinitialized on the network such that the client device would be assigned a new network address (e.g., an IP address associated with the geography of network anchor point 704-3 rather than the geography of network anchor point 704-1) and, consequently, would be associated with the more proximate network anchor point 704-3. As with the scenario shown in FIG. 7, in a scenario in which this reinitialization is triggered, it may be desirable (and may indeed be the course of action taken by many service orchestration algorithms including conventional algorithms) to select, as the most optimal multi-access server to fulfill the service request, the multi-access server 304 most proximate to the mobile device 306 (i.e., multi-access server 304-5 in this example).

However, there may be other circumstances under which this relatively large movement does not trigger the client device 306 to be reinitialized to the network, nor to become associated with network anchor point 704-3. For instance, if client device 306 is moved from the initialization location to the current location without ever being reset, power cycled (e.g., turned off and back on, etc.), put into airplane mode, etc., the device and/or the network may prioritize session continuity above considerations such as geographic accuracy of an assigned network address, therefore never having cause to perform the reinitialization. In other examples, a static network address may be assigned to a client device 306 that is not indicative of the actual geographical location of the client device 306, or the client device may otherwise end up associated with a network anchor point 704 that is not the most proximate network anchor point 704 for various other reasons.

Regardless of the circumstances leading to the client device 306 being associated with network anchor point 704-1 while being located remote from network anchor point 704-1 (e.g., and possibly more proximate to other network anchor points such as network anchor point 704-3), methods and systems for multi-access server orchestration described herein may account for network anchor point geography in orchestrating a multi-access server to fulfill a service request for client device 306 at this location. For example, as shown by traffic flows 802-1 and 802-2, system 100 may determine that multi-access server 304-1 is in a geographical location that is preferable for fulfilling a service request for the client device 306 over, for instance, multi-access server 304-5. This may be true despite that multi-access server 304-5 is more proximate to the client device 306 and that conventional algorithms would hence determine the location of multi-access server 304-5 to be the more ideal of the two.

Because network traffic to the client device 306 is routed through network anchor point 704-1, FIG. 8 clearly shows the potential transport latency savings gained by routing traffic over traffic flows 802-1 and 802-2 (e.g., when selecting multi-access server 304-1 to fulfill the service request) instead of routing traffic over traffic flows 802-1 and 802-3 (e.g., which would represent the path of the traffic if multi-access server 304-5 were selected to fulfill the service request). Specifically, it is shown that the total geographic distance network traffic travels over traffic flows 802-1 and 802-2 is significantly less than the total geographic distance network traffic would travel over traffic flows 802-1 and 802-3, which will be understood to potentially result in significantly improved latency performance and other benefits described herein.

In the example scenario illustrated by FIG. 8, latency performance benefits are shown to arise from accounting for the geographic location of a client device's network anchor point (e.g., and the proximity of that location to different multi-access servers), rather than only accounting for the geographic location of the client device itself. In the same or other scenarios, various benefits may also arise when system 100 generates an ordered listing of candidate multi-access servers 304 based on a service area determined and designated for the network anchor point in the ways that have been described.

To further illustrate such a scenario, FIG. 9 shows another special-case scenario like that of FIG. 8 in which the initialization location of a client device 306 (i.e., illustrated as the black circle in FIG. 9) is at a significantly different location than the current location of the client device 306 (i.e., illustrated as the white circle in FIG. 9). In this scenario, the initialization location is near network anchor point 704-2, so it will be understood that network anchor point 704-2 may be associated with the client device 306, and that all network traffic to and from the client device 306 may be routed through network anchor point 704-2 even after the client device has relocated to a relatively remote location within coverage area 700.

FIG. 9 shows a traffic flow 902-1 between the client device 306 at the current location and the assigned network anchor point 704-2 that network traffic may be required to traverse. However, as illustrated by a service area 904 of network anchor point 704-2 (e.g., which is depicted by a dotted line defining an area around network anchor point 704-2 that includes several multi-access servers 304 such as multi-access servers 304-3, 304-4, and 304-6), there may be various viable options for ways that network traffic may flow depending on which multi-access server 304 from the subset included within service area 904 is selected. For example, a traffic flow 902-2 illustrates a route for network traffic if multi-access server 304-3 is selected to fulfill the service request, a traffic flow 902-3 illustrates a route for network traffic if multi-access server 304-4 is selected to fulfill the service request, and a traffic flow 902-4 illustrates a route for network traffic if multi-access server 304-6 is selected to fulfill the service request.

It is noted that, regardless of how system 100 may order the three multi-access servers 304 in service area 904 (i.e., multi-access servers 304-3, 304-4, and 304-6 within the determined subset), any of these multi-access servers may provide superior latency performance when compared to multi-access server 304-5, even though multi-access server 304-5 is the multi-access server most proximate to the current location of client device 306. Accordingly, it will be understood that by determining the service area of network anchor point 704-2 and ordering the preferability of multi-access servers included within that service area, system 100 may provide the client device 306 service orchestration that includes various viable options that will each result in superior service request fulfillment than may be provided by a conventional orchestration algorithm that, neglecting to account for the geography of the network anchor point assigned to the client device 306, selects multi-access server 304-5 due to its being the most geographically proximate multi-access server to the client device 306.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 10:
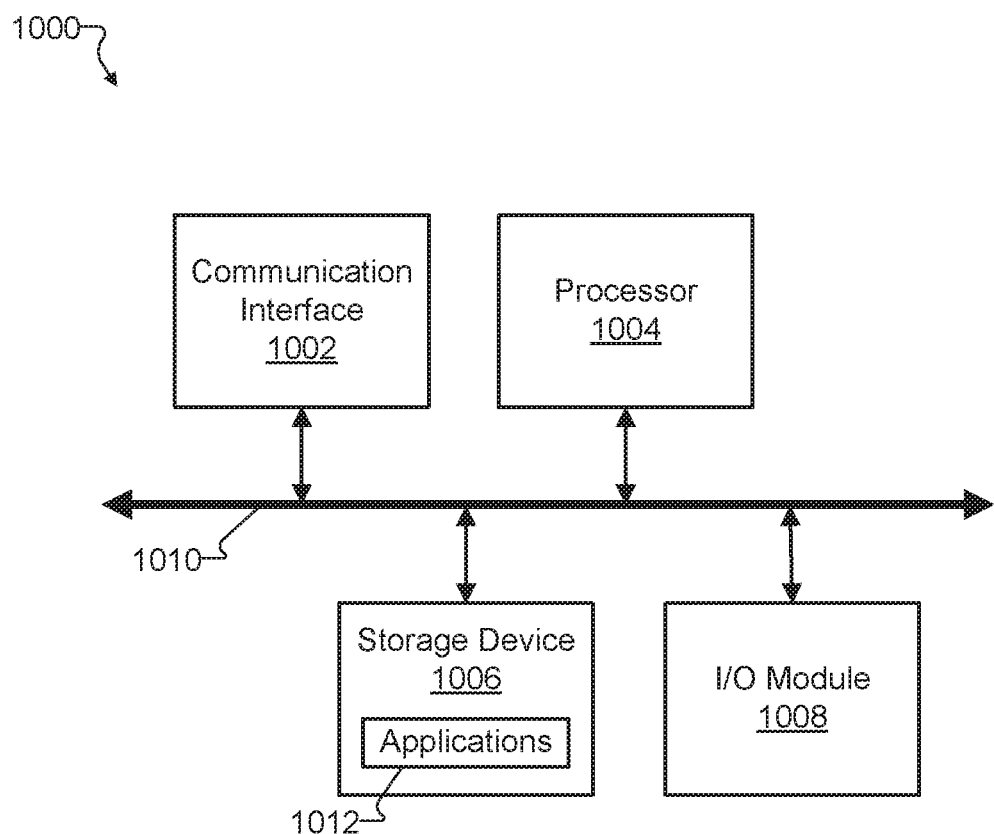
FIG. 10 shows an illustrative computing device according to embodiments described herein.

FIG. 10 shows an illustrative computing device 1000 that may be specifically configured to perform one or more of the processes described herein. For example, computing system 1000 may include or implement (or partially implement) a multi-access server orchestration system such as system 100 or any component included therein (e.g., a client exposure service system such as client exposure service system 402, a service registry system such as service registry system 404, a network anchor service system such as network anchor service system 406, a server selection system such as server selection system 408, etc.), an application development system such as application development system 412, a multi-access server such as one of multi-access servers 304, a client device such as one of client devices 306, or any other computing systems or devices described herein.

As shown in FIG. 10, computing system 1000 may include a communication interface 1002, a processor 1004, a storage device 1006, and an input/output (I/O) module 1008 communicatively connected via a communication infrastructure 1010. While an illustrative computing system 1000 is shown in FIG. 10, the components illustrated in FIG. 10 are not intended to be limiting. Additional or alternative components may be used in other embodiments. Components of computing system 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, an audio/video connection, and any other suitable interface.

Processor 1004 generally represents any type or form of processing unit capable of processing data or interpreting, executing, and/or directing execution of one or more of the instructions, processes, and/or operations described herein. Processor 1004 may direct execution of operations in accordance with one or more applications 1012 or other computer-executable instructions such as may be stored in storage device 1006 or another computer-readable medium.

Storage device 1006 may include one or more data storage media, devices, or configurations and may employ any type, form, and combination of data storage media and/or device. For example, storage device 1006 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1006. For example, data representative of one or more executable applications 1012 configured to direct processor 1004 to perform any of the operations described herein may be stored within storage device 1006. In some examples, data may be arranged in one or more databases residing within storage device 1006.

I/O module 1008 may include one or more I/O modules configured to receive user input and provide user output. One or more I/O modules may be used to receive input for a single virtual experience. I/O module 1008 may include any hardware, firmware, software, or combination thereof supportive of input and output capabilities. For example, I/O module 1008 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing system 1000. For example, one or more applications 1012 residing within storage device 1006 may be configured to direct processor 1004 to perform one or more processes or functions associated with processor 104 of system 100. Likewise, memory 102 of system 100 may be implemented by or within storage device 1006.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various illustrative embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   obtaining, by a multi-access server orchestration system by way of a communication network, a service request for a client device, the service request indicating a client identity of the client device and representing a request for orchestration of service to be provided to the client device by a multi-access server of a set of multi-access servers associated with the communication network;
   identifying, by the multi-access server orchestration system in response to the service request and based on the client identity of the client device, a network anchor point through which network traffic on the communication network is routed to the client device;
   determining, by the multi-access server orchestration system, a subset of the set of multi-access servers, the subset corresponding to a service area of the identified network anchor point and including a first multi-access server and a second multi-access server capable of fulfilling the service request for the client device; and
   ordering, by the multi-access server orchestration system, the multi-access servers included within the subset to form an ordered listing of multi-access servers from a most-preferred to a least-preferred multi-access server for fulfilling the service request, wherein:
      the first multi-access server is located more proximate to the network anchor point than to the client device at a time when the service request is obtained,
      the second multi-access server is located more proximate to the client device than to the network anchor point at the time when the service request is obtained, and
      the ordered listing designates the first multi-access server to be more highly preferred for fulfilling the service request than the second multi-access server.

2. The method of claim 1, wherein:
   the client identity is indicated by a client identifier that includes a network address of the client device;
   the network address is based on an initialization location of the client device at which the client device was located during an initialization of the client device with respect to the communication network;
   the network anchor point identified based on the client identity is at a geographic location proximate to the initialization location of the client device; and the determining of the subset of multi-access servers includes selecting multi-access servers for inclusion in the subset based on geographic proximity of the multi-access servers to the geographic location of the network anchor point.

3. The method of claim 2, wherein a geographic location of at least one of the multi-access servers selected for inclusion in the subset is more proximate to the geographic location of the network anchor point than to a geographic location of the client device at a time when the service request is obtained.

4. The method of claim 1, further comprising providing, by the multi-access server orchestration system, the ordered listing of multi-access servers to the client device by way of the communication network and as a response to the service request.

5. The method of claim 1, further comprising determining, by the multi-access server orchestration system, a first geographic location of the first multi-access server and a second geographic location of the second multi-access server at the time when the service request is obtained;
wherein the ordering of the multi-access servers included within the subset to form the ordered listing of multi-access servers is based on the first and second geographic locations that have been determined.

6. The method of claim 1, further comprising obtaining, by the multi-access server orchestration system, performance data indicative of performance measurements for one or more multi-access servers in the subset;
wherein the ordering of the multi-access servers included within the subset to form the ordered listing of multi-access servers is based on the obtained performance data.

7. The method of claim 1, further comprising:
obtaining, by the multi-access server orchestration system, performance data indicative of performance measurements for one or more multi-access servers in the set of multi-access servers; and
obtaining, by the multi-access server orchestration system, performance parameters associated with multi-access server capabilities for fulfilling the service request for the client device;
wherein the determining of the subset of multi-access servers includes selecting multi-access servers for inclusion in the subset based on the obtained performance data and the obtained performance parameters.

8. The method of claim 1, wherein:
the service request further indicates one or more multi-access servers of the set of multi-access servers; and
the determining of the subset of multi-access servers includes selecting the one or more multi-access servers indicated by the service request for inclusion in the subset.

9. The method of claim 1, further comprising:
obtaining, by the multi-access server orchestration system, resource data indicative of hardware resources available to one or more multi-access servers in the set of multi-access servers;
wherein the determining of the subset of multi-access servers includes selecting multi-access servers for inclusion in the subset based on the obtained resource data.

10. The method of claim 1, embodied as computer-executable instructions on at least one non-transitory computer-readable medium.

11. A system comprising:
a memory storing instructions; and
a processor communicatively coupled to the memory and configured to execute the instructions to:
obtain, by way of a communication network, a service request for a client device, the service request indicating a client identity of the client device and representing a request for orchestration of service to be provided to the client device by a multi-access server of a set of multi-access servers associated with the communication network;
identify, in response to the service request and based on the client identity of the client device, a network anchor point through which network traffic on the communication network is routed to the client device;
determine a subset of the set of multi-access servers, the subset corresponding to a service area of the identified network anchor point and including a first multi-access server and a second multi-access server capable of fulfilling the service request for the client device; and
order the multi-access servers included within the subset to form an ordered listing of multi-access servers from a most-preferred to a least-preferred multi-access server for fulfilling the service request, wherein:
the first multi-access server is located more proximate to the network anchor point than to the client device at a time when the service request is obtained,
the second multi-access server is located more proximate to the client device than to the network anchor point at the time when the service request is obtained, and
the ordered listing designates the first multi-access server to be more highly preferred for fulfilling the service request than the second multi-access server.

12. The system of claim 11, wherein:
the client identity is indicated by a client identifier that includes a network address of the client device;
the network address is based on an initialization location of the client device at which the client device was located during an initialization of the client device with respect to the communication network;
the network anchor point identified based on the client identifier is at a geographic location proximate to the initialization location of the client device; and
the determining of the subset of multi-access servers includes selecting multi-access servers for inclusion in the subset based on geographic proximity of the multi-access servers to the geographic location of the network anchor point.

13. The system of claim 12, wherein a geographic location of at least one of the multi-access servers selected for inclusion in the subset is more proximate to the geographic location of the network anchor point than to a geographic location of the client device at a time when the service request is obtained.

14. The system of claim 11, wherein the processor is further configured to execute the instructions to provide the ordered listing of multi-access servers to the client device by way of the communication network and as a response to the service request.

15. The system of claim 11, wherein:
the processor is further configured to execute the instructions to determine a first geographic location of the first multi-access server in the subset and a second geographic location of the second multi-access server at the time when the service request is obtained; and
the ordering of the multi-access servers included within the subset to form the ordered listing of multi-access servers is based on the first and second geographic locations that have been determined.

16. The system of claim 11, wherein:
the processor is further configured to execute the instructions to obtain performance data indicative of performance measurements for one or more multi-access servers in the subset; and
the ordering of the multi-access servers included within the subset to form the ordered listing of multi-access servers is based on the obtained performance data.

17. The system of claim 11, wherein:
the processor is further configured to execute the instructions to:
obtain performance data indicative of performance measurements for one or more multi-access servers in the set of multi-access servers, and
obtain performance parameters associated with multi-access server capabilities for fulfilling the service request for the client device; and
the determining of the subset of multi-access servers includes selecting multi-access servers for inclusion in the subset based on the obtained performance data and the obtained performance parameters.

18. The system of claim 11, wherein:
the service request further indicates one or more multi-access servers of the set of multi-access servers; and
the determining of the subset of multi-access servers includes selecting the one or more multi-access servers indicated by the service request for inclusion in the subset.

19. A system comprising:
a client exposure service system including a first processor configured to obtain, by way of a communication network, a service request for a client device, the service request indicating a client identity of the client device and representing a request for orchestration of service to be provided to the client device by a multi-access server of a set of multi-access servers associated with the communication network;
a network anchor service system communicatively coupled to the client exposure service system and including a second processor configured to identify, in response to the service request and based on the client identity of the client device, a network anchor point through which network traffic on the communication network is routed to the client device; and
a server selection system communicatively coupled to the client exposure service system and the network anchor service system and including a third processor configured to:
determine a subset of the set of multi-access servers, the subset corresponding to a service area of the identified network anchor point and including a first multi-access server and a second multi-access server capable of fulfilling the service request for the client device, and
order the multi-access servers included within the subset to form an ordered listing of multi-access servers from a most-preferred to a least-preferred multi-access server for fulfilling the service request, wherein:
the first multi-access server is located more proximate to the network anchor point than to the client device at a time when the service request is obtained,
the second multi-access server is located more proximate to the client device than to the network anchor point at the time when the service request is obtained, and
the ordered listing designates the first multi-access server to be more highly preferred for fulfilling the service request than the second multi-access server.

20. The system of claim 19, further comprising a service registry system communicatively coupled to the client exposure service system and including a fourth processor configured to provide, to the server selection system by way of the client exposure service system, performance parameters associated with multi-access server capabilities for fulfilling the service request for the client device;
wherein the third processor of the server selection system determines the subset of multi-access servers by selecting multi-access servers for inclusion in the subset based on the performance parameters provided by the service registry system and further based on performance data indicative of performance measurements for one or more multi-access servers in the set of multi-access servers.

* * * * *